No. 654,889.  
P. M. GOSSELIN.  
ANIMAL POKE.  
(Application filed Apr. 2, 1900.)
Patented July 31, 1900.
(No Model.)
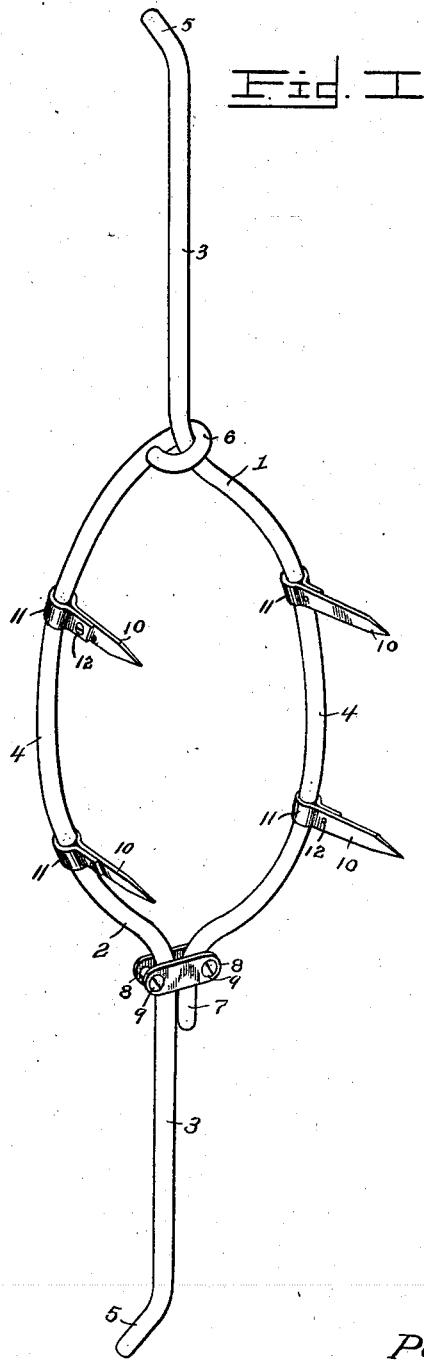
Fig. 1.
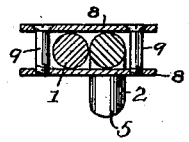
Fig. 2.
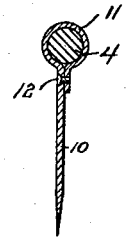
Fig. 3.
Witnesses  
Paul M. Gosselin Inventor,  
By his Attorneys,  

UNITED STATES PATENT OFFICE.

PAUL M. GOSSELIN, OF NAVAJOE, OKLAHOMA TERRITORY.

ANIMAL-POKE.

SPECIFICATION forming part of Letters Patent No. 654,889, dated July 31, 1900.

Application filed April 2, 1900. Serial No. 11,184. (No model.)

*To all whom it may concern:*

Be it known that I, PAUL M. GOSSELIN, a citizen of the United States, residing at Navajoe, in the county of Greer and Territory of Oklahoma, have invented a new and useful Animal-Poke, of which the following is a specification.

This invention relates to animal-pokes, and has for its object to provide an improved device of this character which is arranged for facilitating the application to and removal from the neck of the animal, and at the same time the separable parts thereof are firmly held against accidental displacement when the device is in use. It is also designed to provide adjustable spurs or prongs, so that their positions may be changed to suit any particular animal and may also be entirely removed whenever it is not desired to prick or prod the animal by an attempt to pass through a fence or other similar obstruction.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is perspective view of an animal-poke constructed in accordance with the present invention. Fig. 2 is a transverse sectional view showing the manner of connecting the opposite sections of the device. Fig. 3 is a detail transverse sectional view showing the manner of adjustably connecting the spurs or prods to the device.

Corresponding parts in the several figures of the drawings are designated by like characters of reference.

Referring to the accompanying drawings, it will be seen that the present device comprises the opposite sections 1 and 2, which are substantial duplicates. Each section is formed from a single rod or bar of metal, of which one end portion is in the form of a substantially-straight arm 3 and the opposite end portion is bowed outwardly, as indicated at 4, while the free extremity of the arm is bent forwardly at substantially right angles to the plane of the arm and the bowed portion, so as to form a hook 5. The outer free end of the bowed portion of the section 2 is bent into an eye or loop 6, which loosely embraces the other section at the bend where the straight and bowed portions thereof merge into each other, so as to form a hinged or pivotal connection for the sections. The outer free end of the bowed portion of the section 1 is extended straight outward to form the tongue 7, which is designed to lie flat against the adjacent inner side of the arm 3 of the opposite section.

By reason of the hinged or pivotal connection the sections may be separated or swung apart, so that the bowed portions thereof may be fitted to the opposite sides of the neck of an animal, after which the tongue 7 and the adjacent arm 3 are connected by means of the pair of clamp-plates 8, that embrace the tongue and the arm. These plates are provided with corresponding perforations, which are located upon the outer sides of the tongue and the arm, respectively, the perforation of one plate being screw-threaded, so as to receive the screw-threaded portions of the removable fastenings 9, which bear against the outer sides of the arm and the tongue, respectively.

Each bowed portion is provided with one or more prods or spurs 10, each of which is formed from a single piece of metal that is sharpened at its outer end and has its opposite end folded to form a hook or open loop 11, that embraces the bowed portion of the section and is bound firmly thereagainst by means of a removable screw-threaded fastening 12, that passes through the folded extremity of the metal strip and the body portion thereof. By this means the spurs or prods may be adjusted longitudinally upon the sections, so that they may be properly arranged for different animals and may also be removed when not desired to prod the animal.

From the foregoing description it will be seen that the parts of the device are positively connected, so as to preclude the possibility of loss thereof, and also are arranged for conveniently applying the device to the animal's neck, the opposite hooks or projections 5 being designed to hang or catch in the fence or other obstruction, and thereby force the spurs or prods 10 to prick the animal, and thus deter the latter from damaging the fence by a persistent attempt to pass through the same.

What is claimed is—

1. An animal-poke, comprising opposite substantially-duplicate sections, each of which is formed from a single bar or rod, having a straight end portion, and an outwardly-bowed opposite end portion, the outer extremity of the straight portion being formed into an outwardly-directed hook or projection, one section having the outer end of its bowed portion formed into a loop or eye embracing the straight portion of the other section adjacent to the bowed portion thereof, and forming a hinged or pivotal connection for the sections, the outer end of the other bowed portion being formed into a tongue to lie against the adjacent side of the other straight portion, opposite clamp-plates embracing the tongue and the adjacent portion of the other section, and removable fastenings connecting the plates and binding the latter upon the sections.

2. The combination with an animal-poke, comprising a neck-embracing portion, having opposite upwardly and downwardly extending hooked arms, of a plurality of spurs or prods each of which is formed from a single strip of metal that is pointed at its outer end, and has its opposite end bent or folded about the neck-embracing portion of the poke, and a removable fastening connecting the folded end of the strip to the body thereof.

In testimony that I claim the foregoing as my own I have hereto affixed my signature in the presence of two witnesses.

PAUL M. GOSSELIN.

Witnesses:
J. W. McCLURG,
JAMES D. BAILEY.